(12) United States Patent
Motoyanagi

(10) Patent No.: US 9,162,486 B2
(45) Date of Patent: Oct. 20, 2015

(54) THREE-DIMENSIONAL PRINTER, THREE-DIMENSIONAL IMAGE FORMING METHOD, AND THREE-DIMENSIONAL IMAGE

(71) Applicant: CASIO COMPUTER CO., LTD., Shibuya-ku, Tokyo (JP)

(72) Inventor: Yoshimune Motoyanagi, Hamura (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 14/467,271

(22) Filed: Aug. 25, 2014

(65) Prior Publication Data

US 2015/0070452 A1 Mar. 12, 2015

(30) Foreign Application Priority Data

Sep. 6, 2013 (JP) .................................. 2013-184583
Feb. 3, 2014 (JP) .................................. 2014-018807

(51) Int. Cl.
*B41J 11/00* (2006.01)
*B41J 3/60* (2006.01)

(52) U.S. Cl.
CPC . *B41J 11/002* (2013.01); *B41J 3/60* (2013.01)

(58) Field of Classification Search
CPC ........ B41J 11/0015; B41J 11/002; B41J 2/01; B41M 7/0072
See application file for complete search history.

(56) References Cited

U.S. PATENT DOCUMENTS

| 2004/0036922 A1* | 2/2004 | Yamada et al. ............... 358/3.21 |
| 2012/0218338 A1 | 8/2012 | Kanamura et al. |
| 2013/0161874 A1 | 6/2013 | Horiuchi |
| 2013/0280498 A1* | 10/2013 | Horiuchi et al. ........... 428/195.1 |

FOREIGN PATENT DOCUMENTS

| JP | 64028660 A | 1/1989 |
| JP | 2001150812 A | 6/2001 |
| JP | 2012171317 A | 9/2012 |
| JP | 2013132765 A | 7/2013 |

* cited by examiner

*Primary Examiner* — Manish S Shah
*Assistant Examiner* — Jeremy Delozier
(74) *Attorney, Agent, or Firm* — Holtz, Holtz, Goodman & Chick PC

(57) ABSTRACT

When a heat capacity of a recording medium having a base material coated with a foamable resin layer is larger than a normal heat capacity, to form a raised amount equal to that with the normal case with a normal heating quantity, a turned mirror image of the image is generated. The image is transferred onto the front face of the recording medium and fixed. The recording medium is reversed, and conveyed again to the transfer part. The turned mirror image is transferred onto the rear face of the recording medium and fixed. The recording medium is heated with the heat quantity equal to that in the normal case, and combination of heat absorbed by the turned minor image and heat absorbed by the image is transmitted to the foamable resin layer to expand the foamable resin layer.

10 Claims, 11 Drawing Sheets

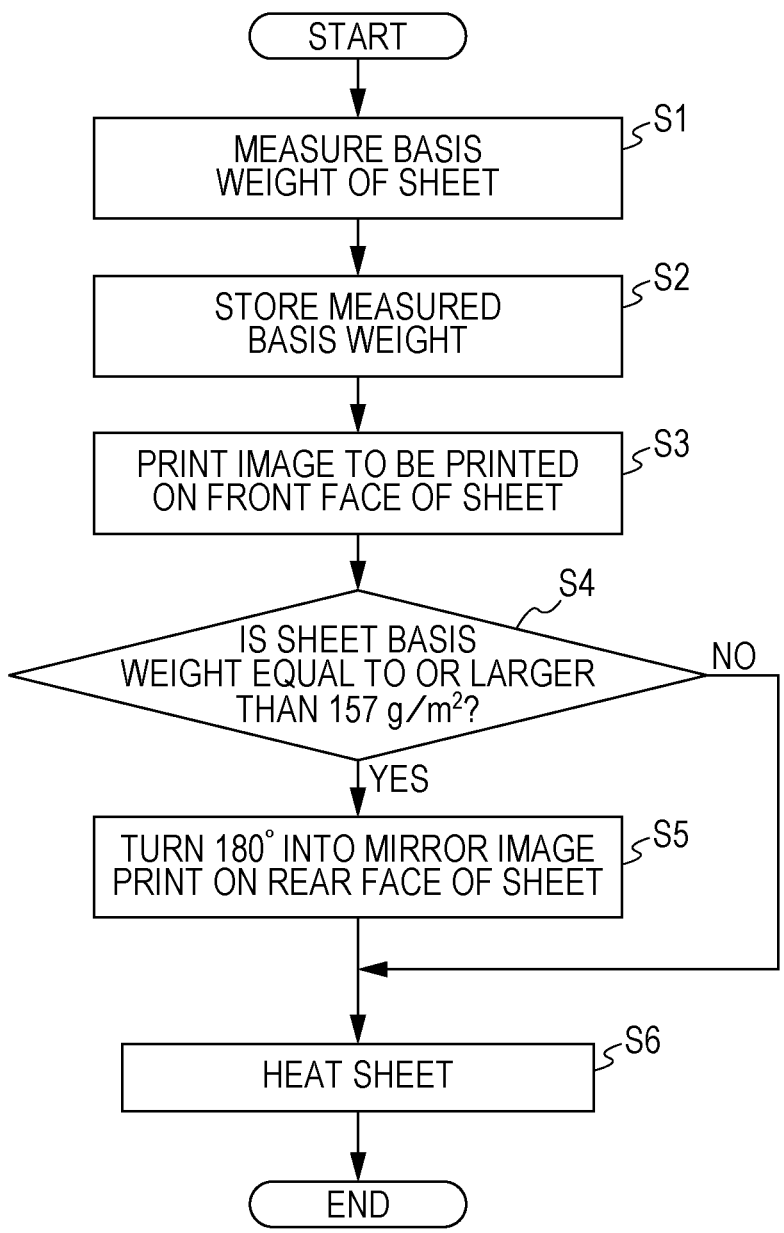

THREE-DIMENSIONAL PRINTER, THREE-DIMENSIONAL IMAGE FORMING METHOD, AND THREE-DIMENSIONAL IMAGE

CROSS-REFERENCE TO RELATED APPLICATIONS

This application claims the benefit of Japanese Patent Application No. 2013-184583 filed on Sep. 6, 2013 and Japanese Patent Application No. 2014-018807 filed on Feb. 3, 2014, which are hereby incorporated by reference herein in their entireties.

BACKGROUND

1. Technical Field

The present invention relates to a three-dimensional printer configured to form a raised image on a thermally expandable sheet, a three-dimensional image forming method, and a three-dimensional image.

2. Related Art

In related art, JP 64-028660 A proposes a method for forming a three-dimensional image by forming a front-back reversed image of a desired image on a rear face, on which no thermally expandable coating layer is formed, of a thermally expandable sheet with an image forming material excellent in light absorption characteristics, irradiating the image forming side of the thermally expandable sheet with light to selectively heat an image part by using the light absorption characteristics of the image forming material to expand the thermally expandable coating layer.

The coating layer formed on the front face (the face on which an image is to be printed) of the thermally expandable sheet disclosed in JP 64-028660 A has microspheres dispersed thereon, the microspheres being obtained by microencapsulating a low-boiling, vaporizable substance with a thermoplastic resin. The microcapsules expand by heat applied to the thermally expandable sheet and forms raised portions on the sheet front face.

With the technology disclosed in JP 64-028660 A, the image part is selectively heated to obtain a three-dimensional image by using the light absorption characteristics of the image forming material. If, however, the thickness of the sheet (sheet base material) before the coating layer is formed is increased, that is, if the basis weight increases, there is a problem that the heat capacity of the sheet increases and thus the quantity of heat applied to the microcapsules decreases, resulting in that the raised amount of the raised portions decreases.

The heat capacity is increased not only by the problem of the increased basis weight of the sheet base material but also when a sheet made of another material is adhered to the sheet base material. In other words, the raised amount of the raised portions resulting from thermal expansion of the coating layer varies widely depending on the magnitude of the heat capacity of the thermally expandable sheet itself.

With a thermally expandable sheet with a large heat capacity, the raised amount of the raised portions can be prevented from decreasing by increasing the quantity of heat applied thereto. A large quantity of heat applied to the thermally expandable sheet, however, causes a failure such as thermal expansion of a non-printed region.

SUMMARY

The present invention solves the aforementioned problems of the related art, and an object thereof is to provide a three-dimensional printer and a three-dimensional image forming method to form images always with desired raised amounts on thermally expandable sheets having different heat capacities, and a three-dimensional image formed by the three-dimensional image forming method.

To solve the aforementioned problems, a three-dimensional printer according to the present invention includes: a first printed image forming unit configured to form a first printed image on one face of a thermally expandable sheet in which a thermally expandable layer is formed; a second printed image forming unit configured to form a second printed image on the other face of the thermally expandable sheet, the second printed image having a higher density as a thermal capacity of the thermally expandable sheet is larger; and a heat applying and expanding unit configured to apply thermal energy to the thermally expandable sheet to expand the thermally expandable layer.

BRIEF DESCRIPTION OF THE DRAWINGS

FIG. 8 is a flowchart illustrating processing operation for forming a desired raised amount in a printed image on a recording medium regardless of the magnitude of the heat capacity of the recording medium by a CPU of the controller of the three-dimensional printer according to the first embodiment;

DETAILED DESCRIPTION

Embodiment of the present invention will be described in detail below with reference to the drawings.

First Embodiment

Figure 1:
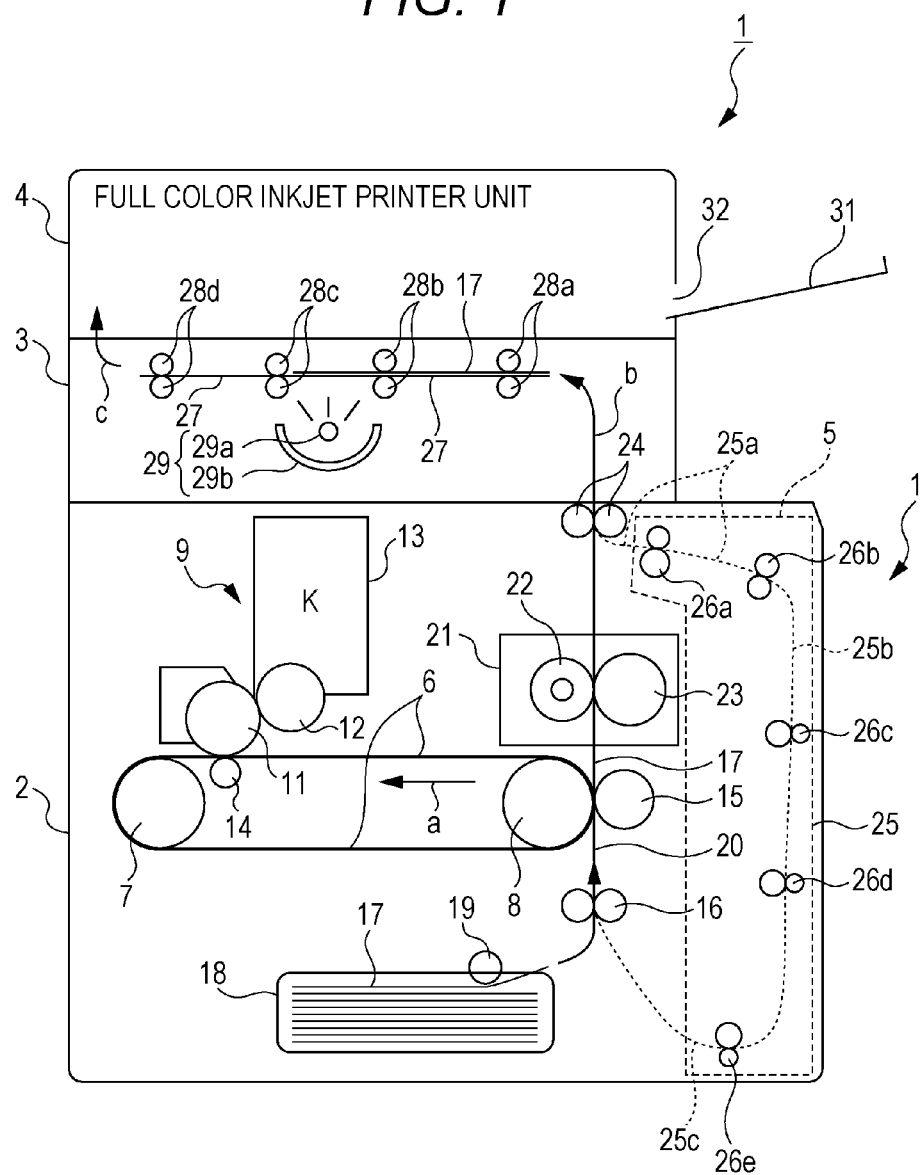
FIG. 1 is a cross-sectional view schematically illustrating an internal configuration of a three-dimensional printer according to a first embodiment.

FIG. 1 is a cross-sectional view schematically illustrating an internal configuration of a three-dimensional printer according to a first embodiment. As illustrated in FIG. 1, the three-dimensional printer 1 includes a lowermost black toner printing unit 2, a thermal expansion processing unit 3 thereon, and an uppermost full-color inkjet printer unit (hereinafter simply referred to as an inkjet printer unit) 4.

The black toner printing unit 2 includes an endless transfer belt 6 extending in the horizontal direction at the center of the inside of the printer. The transfer belt 6 is looped around a driving roller 7 and a driven roller 8 while being tightly stretched by a stretching mechanism that is not illustrated, driven by the driving roller 7 to move circularly in the counterclockwise direction indicated by an arrow a in FIG. 1.

A photosensitive drum 11 of an image forming unit 9 is provided in contact with an upper surface of the transfer belt 6 moving circularly. The photosensitive drum 11 is provided with a cleaner, an initialization charger and an optical write head, which are not illustrated, followed by a developing roller 12 and the like close to and around the peripheral surface thereof.

The developing roller 12 is placed at a side opening of a toner container 13. The toner container 13 contains black toner K. The black toner K is made of nonmagnetic monocomponent toner or nonmagnetic dual component toner.

The developing roller 12 carries a thin layer of black toner K contained in the toner container 13 on the surface thereof and develops an image in the black toner K on an electrostatic latent image formed on the peripheral surface of the photosensitive drum 11 by the optical write head.

A primary transfer roller 14 is pressed against a lower portion of the photosensitive drum 11 with the transfer belt 6 therebetween and forms a primary transfer part here. A bias voltage is supplied to the primary transfer roller 14 from a bias supply that is not illustrated.

The primary transfer roller 14 applies the bias voltage supplied from the bias supply to the transfer belt 6 at the primary transfer part to transfer the image in the black toner K developed on the peripheral surface of the photosensitive drum 11 onto the transfer belt 6.

A secondary transfer roller 15 is pressed against the driven roller 8 around which a right end portion of the transfer belt 6 illustrated in FIG. 1 with the transfer belt 6 therebetween, and forms a secondary transfer part here. A bias voltage is supplied to the secondary transfer roller 15 from a bias supply that is not illustrated.

The secondary transfer roller 15 applies the bias voltage supplied from the bias supply to the transfer belt 6 at the secondary transfer part to transfer the image in the black toner K primarily transferred on the transfer belt 6 onto a recording medium 17 conveyed from below in FIG. 1 as indicated by an arrow along an image forming conveyance path 20. Note that a thermally expandable sheet is used for the recording medium 17 of the present embodiment.

The recording medium 17 is stacked and stored in a recording medium storage part 18 that is a sheet cassette or the like, one sheet at the top is taken out by a sheet feeding roller 19 and delivered by a pair of standby rollers 16, and conveyed on the conveyance path 20, and the image in the black toner K is transferred while the recording medium 17 passes through the secondary transfer part.

The recording medium 17 that has passed the secondary transfer part while the image in the black toner K is transferred is conveyed to a fixing part 21. A heating roller 22 and a pressing roller 23 of the fixing part 21 hold the recording medium 17 therebetween and apply heat and pressure to the recording medium 17 while conveying the recording medium 17. As a result, the image in the black toner K secondarily transferred onto the recording medium 17 is fixed onto the sheet surface thereof.

The recording medium 17 having the image fixed on the sheet surface thereof and further conveyed by the heating roller 22 and the pressing roller 23 is then conveyed by a pair of discharge rollers 24, discharged partially to the thermal expansion processing unit 3 above, and suspended immediately before a back end thereof passes through the pair of discharge rollers 24.

Note that the speed at which the recording medium 17 (thermally expandable sheet) is conveyed at the fixing part 21 is relatively high, and thus the black toner printed region of the thermally expandable sheet is not expanded by the heat of the heating roller 22.

Here, a double-side printing conveyance unit 5 will be described. The double-side printing conveyance unit 5 includes a return path 25 composed of a return start path 25a that branches off in the right direction in FIG. 1 immediately before the pair of discharge rollers 24, a return intermediate path 25b curving downward from the return start path 25a, and a return end path 25c curving to the left opposite to the above to finally turn over a sheet to be returned.

In addition, five pairs of return rollers 26 (26a, 26b, 26c, 26d, and 26e) are arranged along the return path 25. An exit of the return end path 25c merges into a conveyance path communicating from the sheet feeding roller 19 of the recording medium storage part 18 to the pair of standby rollers 16.

As described above, the recording medium 17 suspended immediately before the back end thereof passes through the pair of discharge rollers 24 is delivered to the return start path 25a of the double-side printing conveyance unit 5 from the back end as a result of switching the conveyance path by a switching mechanism that is not illustrated and starting reverse rotation of the pair of discharge rollers 24.

The recording medium 17 delivered into the return start path 25a is reversed front-to-back and turned upside down while passing through the return intermediate path 25b and the return end path 25c and delivered back to the pair of standby rollers 16 by the successive pairs of return rollers 26b, 26c, 26d, and 26e.

The recording medium 17 delivered back to the pair of standby rollers 16 is conveyed on the conveyance path 20 again, and an image in black toner K is transferred onto the rear face of the recording medium 17 while the recording medium 17 passes through the secondary transfer part. The recording medium 17 is then conveyed to the fixing part 21, where the image in the black toner K transferred onto the rear face is fixed on the sheet surface.

The recording medium 17 having the black toner image fixed on the front and rear faces thereof is then conveyed by the pair of discharge rollers 24 and delivered to the thermal expansion processing unit 3 without being suspended this time.

The thermal expansion processing unit 3 is provided with a medium conveyance path 27 formed in the upper part thereof, along which four pairs of conveying rollers 28 (28a, 28b, 28c, and 28*d*) are arranged. In addition, a heat ray emitting unit 29 is arranged substantially below the center of the medium conveyance path 27.

The heat ray emitting unit 29 includes an infrared lamp 29*a*, and a reflector 29*b* having a substantially semicircular cross section surrounding a lower half of the infrared lamp 29*a*. In the present embodiment, the infrared lamp 29*a* is arranged at a position away from the surface of the recording medium 17 conveyed on the medium conveyance path 27 by a certain distance.

The conveyance speed of the pair of conveying rollers 28 conveying the recording medium 17 is set to an optimum speed (mm/sec), and the recording medium 17 is heated to a high temperature that does not cause sheet degradation under this condition to thermally expand a black solid printed region of the recording medium 17.

Note that the conveyance speed of the recording medium 17 in the black toner printing unit 2 is high while the conveyance speed of the recording medium 17 is low in the thermal expansion processing unit 3, and the recording medium 17 is conveyed one sheet by one sheet from the recording medium storage part 18 and is not conveyed successively until the conveyance in the thermal expansion processing unit 3 is completed.

Thus, the recording medium 17 conveyed to the thermal expansion processing unit 3 is retained only for a short time in a bent state along a conveyance path b between the pair of discharge rollers 24 in the black toner printing unit 2 and the first pair of conveying rollers 28*a* in the thermal expansion processing unit 3, which does not cause any inconvenience in the conveyance as a whole.

The recording medium 17 with the black solid printed region raised as a result of thermal expansion in the thermal expansion processing unit 3 is then conveyed along a conveyance path c into the inkjet printer unit 4.

Note that the pairs of conveying rollers 28 described above may be pairs of long rollers extending in the width direction of the recording medium 17 perpendicular to the conveying direction, or may be pairs of short rollers that convey the recording medium 17 by nipping only both side ends of the recording medium 17.

Figure 2:
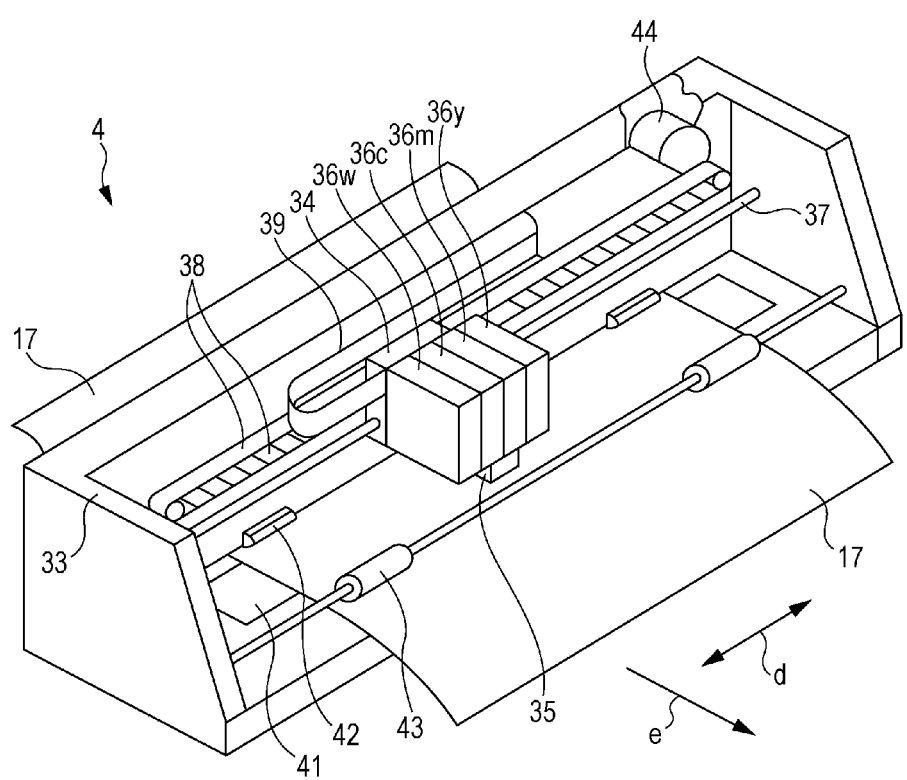
FIG. 2 is a perspective view illustrating a configuration of an inkjet printer unit of the three-dimensional printer according to the first embodiment.

FIG. 2 is a perspective view illustrating a configuration of the inkjet printer unit 4. The inkjet printer unit 4 illustrated in FIG. 2 includes an inner frame 33 illustrated in FIG. 2 between the conveyance path c and a medium discharge opening 32 provided with a sheet output tray 31 outside thereof illustrated in FIG. 1.

The inkjet printer unit 4 includes a carriage 34 provided in a manner capable of reciprocating in the direction indicated by a double-headed arrow d perpendicular to the sheet conveying direction. The carriage 34 has a print head 35 for printing and ink cartridges 36 (36*w*, 36*c*, 36*m*, and 36*y*) containing ink attached thereto.

The cartridges 36*w*, 36*c*, 36*m*, and 36*y* contain white ink W, cyan ink C, magenta ink M, and yellow ink Y, respectively. The cartridges are provided separately or in a form in which ink compartments are integrated in one housing, and connected to the print head 35 having nozzles for discharging the respective color inks.

The carriage 34 is also slidably supported by a guide rail 37 at one side thereof and securely fixed to a toothed driving belt 38 at the other side thereof. This allows the print head 35 and the ink cartridges 36 (36*w*, 36*c*, 36*m*, and 36*y*) to be driven to reciprocate together with the carriage 34 in the direction perpendicular to the sheet conveying direction indicated by the double-headed arrow d in FIG. 2, that is, in the horizontal scanning direction.

A flexible communication cable 39 is connected between the print head 35 and a controller, which will be described later, of the three-dimensional printer 1 with an inner frame 33 therebetween. Print data and control signals are sent from the controller to the print head 35 via this flexible communication cable 39.

A platen 41 that is opposed to the print head 35, extending in the horizontal scanning direction of the print head 35 and forming part of the sheet conveyance path is provided at a lower end of the inner frame 33.

The recording medium 17 is intermittently conveyed in contact with the platen 41 in the vertical scanning direction indicated by an arrow e in FIG. 2 by a pair of sheet feeding rollers 42 (the lower roller of which is behind the recording medium 17 and thus is not illustrated in FIG. 2) and a pair of discharge rollers 43 (the lower roller of which is similarly behind the recording medium 17 and thus is not illustrated).

During a suspension period of the intermittent conveyance of the recording medium 17, the print head 35 is driven by a motor 44 via the toothed driving belt 38 and the carriage 34 to spray ink droplets onto the sheet surface in a state close to the recording medium 17. As a result of repeating the intermittent conveyance of the recording medium 17 and printing during reciprocation of the print head 35 in this manner, printing is performed on the entire surface of the recording medium 17.

For full-color printing over white, which will be described later, the recording medium 17 printed in white is reversely conveyed in the direction opposite to the vertical scanning direction indicated by the arrow e, and then full-color printing is performed while the recording medium 17 is conveyed again in the direction of the arrow e.

For full-color printing on a raised front face as a result of thermal expansion by heating the recording medium 17, which will be described later, the recording medium 17 conveyed from the thermal expansion processing unit 3 via the conveyance path c is turned upside down by using a recording medium turning mechanism, which is not illustrated in FIG. 2, similar to that used in normal double-side printing arranged above the inner frame 33.

Figure 3:
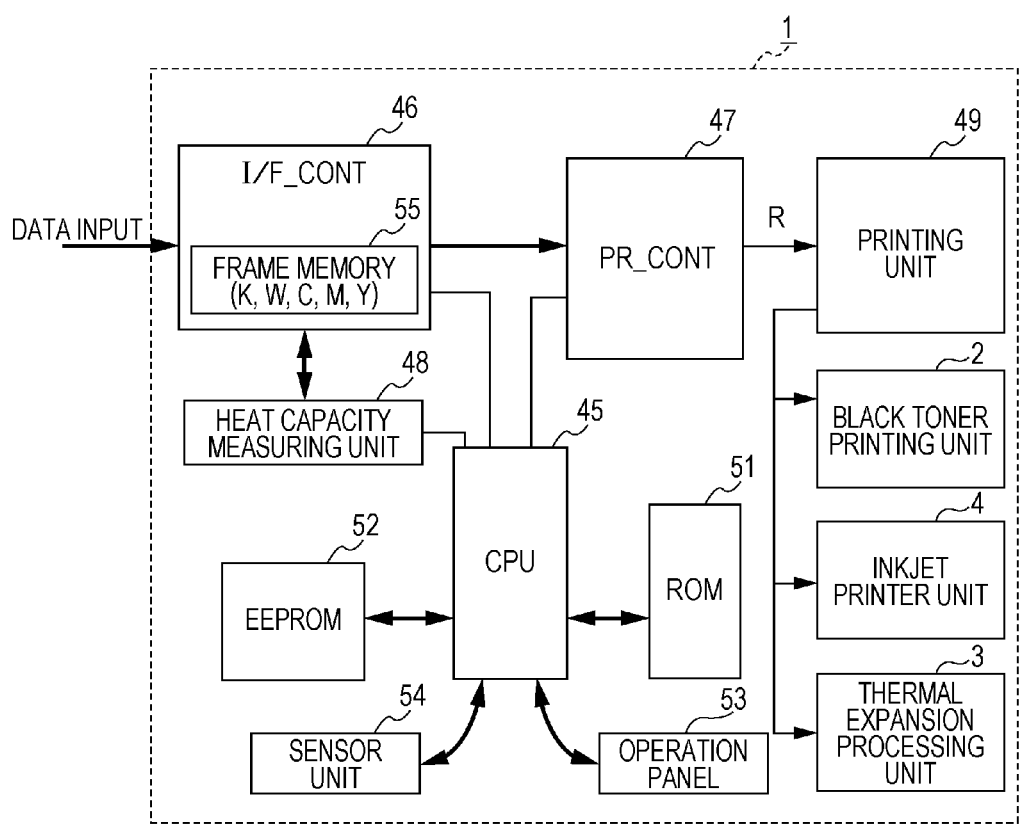
FIG. 3 is a circuit block diagram including a controller of the three-dimensional printer according to the first embodiment.

FIG. 3 is a circuit block diagram including the controller of the three-dimensional printer 1 having the configuration described above. As illustrated in FIG. 3, the circuit block includes a central processing unit (CPU) 45 at the center, and an interface controller (I/F_CONT) 46, a printer controller (PR_CONT) 47, and a heat capacity measuring unit 48 are connected to the CPU 45 via a data bus.

The PR_CONT 47 is connected with a printing unit 49. The heat capacity measuring unit 48 is also connected to the I/F_CONT 46.

The CPU 45 is connected with a read only memory (ROM) 51, an electrically erasable programmable ROM (EEPROM) 52, an operation panel 53 of a body operation unit, and a sensor unit 54 to which outputs from sensors arranged in respective parts are input. The ROM 51 stores system programs. The operation panel 53 has a touch display screen.

The CPU 45 reads out a system program stored in the ROM 51, controls respective components according to the read system program to perform processes. Thus, among the respective components, the I/F_CONT 46 first converts print data supplied from a host device such as a personal computer into bitmap data, and develops the data in a frame memory 55.

The frame memory 55 has storage areas set in association with print data of black toner K and print data of respective color inks of white W, cyan C, magenta M, and yellow Y, and the print data of images of the respective colors are developed in the storage areas. The developed data are output to the PR_CONT 47, and output to the printing unit 49 from the PR_CONT 47.

The printing unit 49 is an engine part configured to control drive output to process loads such as applied voltage of the image forming unit 9 including a rotary drive system including the photosensitive drum 11, the primary transfer roller 14, etc. of the black toner printing unit 2 that are illustrated in FIG. 1 and a driven part including the initialization charger, the optical write head, etc. that are not illustrated in FIG. 1, and driving of the transfer belt 6 and the fixing part 21 under the control of the PR_CONT 47.

The printing unit 49 further controls driving of four pairs of conveying rollers 28 and driving of emission of the heat ray emitting unit 29 of the thermal expansion processing unit 3 illustrated in FIG. 1, and the timing thereof. Furthermore, the printing unit 49 further controls operation of the respective components of the inkjet printer unit 4 illustrated in FIGS. 1 and 2.

The image data of black toner K output from the PR_CONT 47 is then supplied from the printing unit 49 to the optical write head that is not illustrated of the image forming unit 9 of the black toner printing unit 2 illustrated in FIG. 1. The image data of the respective color inks of white W, cyan C, magenta M, and yellow Y output from the PR_CONT 47 are supplied to the print head 35 illustrated in FIG. 2.

FIGS. 4A, 4B, 4C, 5, 6A, 6B, and 7 are diagrams illustrating a basic concept of forming a three-dimensional plane with a black density of an image printed in black toner K on the recording medium 17 and an amount of expansion formed by the thermal expansion processing unit 3 in the three-dimensional printer 1.

Figure 4A:
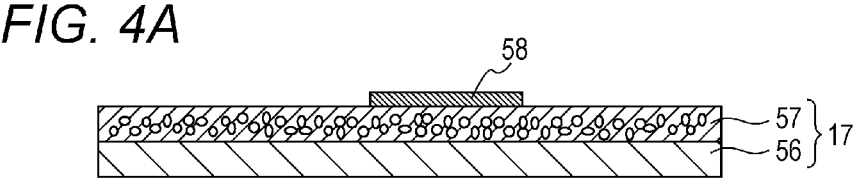
FIGS. 4A, 4B, and 4C are first diagrams illustrating a basic concept of forming a three-dimensional plane with a black density of an image printed in black toner on a recording medium and an amount of expansion formed by a thermal expansion processing unit in the three-dimensional printer according to the first embodiment.
Figure 4B:
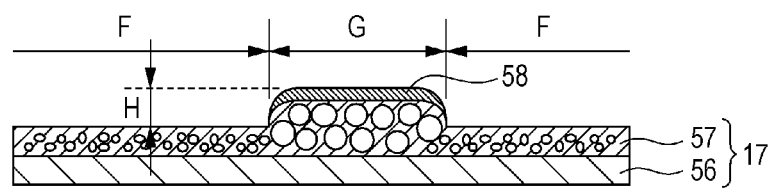
Figure 4C:
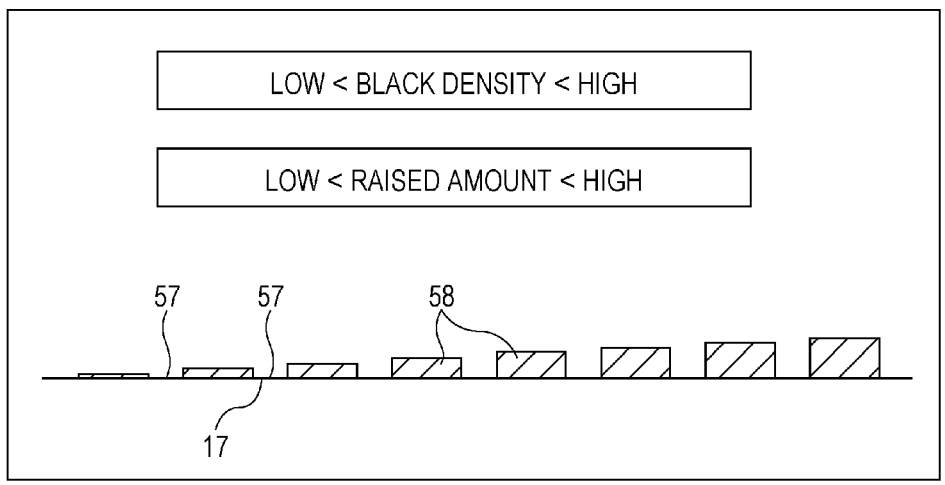

FIGS. 4A and 4B are diagrams for explaining the principle of processing for selectively expanding to partially raise the recording medium 17, and FIG. 4C is a diagram schematically illustrating the relation between the amount of expansion (hereinafter simply referred to as a raised amount) including the area and the height of a raised region and the density of an image printed in black toner K (hereinafter simply referred to as a black density).

As illustrated in FIG. 4A, the recording medium 17 that is a thermally expandable sheet includes a base material 56 and a foamable resin layer 57 containing a thermal foaming agent coated on the base material 56. The base material 56 is paper, cloth such as canvas, a panel material such as plastic, or the like, and the material therefor is not particularly limited. A known commercial product can be used for the recording medium 17 made of the base material 56 and the foamable resin layer 57 containing thermal foaming agent.

A black toner K image 58, which will be described later, is printed on a region to be made three-dimensional of the foamable resin layer 57 of the recording medium 17 in the black toner printing unit 2 in FIG. 1. As illustrated in FIG. 4B, thermal radiation is then emitted by a heater similar to the heat ray emitting unit 29 to heat the surface of the foamable resin layer 57 of the recording medium 17 on which the black toner K image 58 is printed.

As a result, the black toner K image 58 absorbs the thermal radiation, transmits the heat to the thermal foaming agent contained in the foamable resin layer 57. This causes thermal expansion reaction of the thermal foaming agent, and the region G of the recording medium 17 where the black toner K image 58 is printed is expanded and raised, as illustrated in FIG. 4B.

In this manner, the recording medium 17 heated by the heater is made three-dimensional as a result of foaming of the foaming agent only in the region G printed in black toner K due to the difference in heat absorptivity between the region G printed in black toner K and the non-printed region F.

Regarding the height H (hereinafter also simply referred to as a raised amount) of the black toner K image 58 on the printed face made three-dimensional, the height of the black toner K image 58 is low (the raised amount is small) when the black density is low and the height of the black toner K image 58 is high (the raised amount is large) when the black density is high, as illustrated in FIG. 4C. The relation between the black density and the raised amount, however, varies depending on the heat capacity of the recording medium 17.

Figure 5:
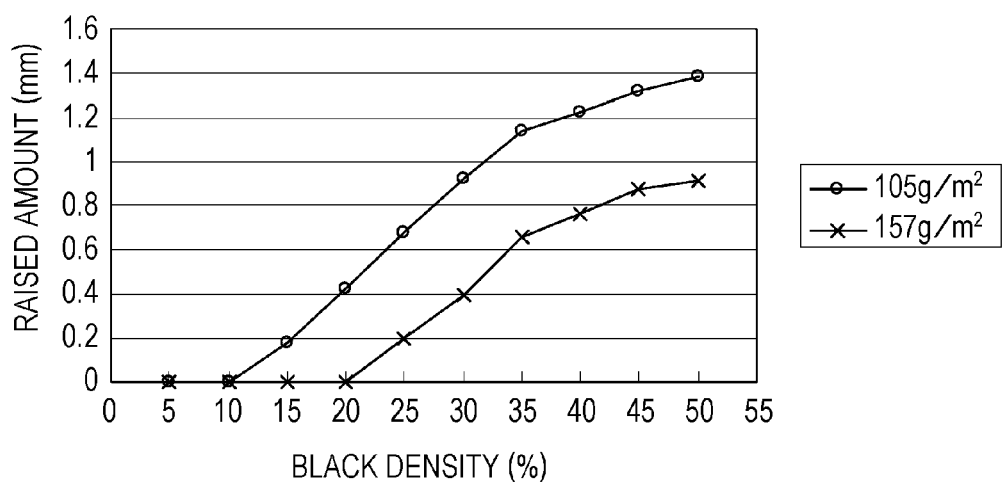
FIG. 5 is a second diagram illustrating the basic concept of forming a three-dimensional plane with a black density of an image printed in black toner on the recording medium and an amount of expansion formed by the thermal expansion processing unit in the three-dimensional printer according to the first embodiment.

FIG. 5 is a characteristic chart illustrating the relation between the black density and the raised amount depending on the difference in the heat capacity of the recording medium 17. FIG. 5 shows the black density (%) on the horizontal axis and the raised amount in height (mm) on the vertical axis. Note that FIG. 5 shows a difference in the sheet basis weight as an example of the difference in the heat capacity.

A curve of plots represented by circles in the characteristic chart illustrated in FIG. 5 shows characteristics of a recording medium 17 with a basis weight of 105 g/m$^2$ with a relatively small heat capacity, and a curve of plots represented by crosses shows characteristics of a recording medium 17 with a basis weight of 157 g/m$^2$ with a relatively large heat capacity. In the two cases, the black toner K image of the same black density is heated under the same heating conditions.

As can be seen in the characteristic chart illustrated in FIG. 5, the relation between the black density and the raised amount is such that not only the black density and the raised amount of the black toner K image 58 are proportional to each other but also the raised amount varies widely with the basis weight of the recording medium 17 (in addition to the basis weight of the sheet base material, a sheet of another material adhered to the sheet base material increases the heat capacity).

Thus, for obtaining always the same raised amount for a black density of an image, the heat capacity of the recording medium 17 is measured, and the heating quantity is increased so that the raised amount will not be decreased if the heat capacity is large.

If the heating quantity is increased for the entire recording medium 17, however, a failure such as thermal expansion of a region on which no image is printed may occur as described above. Thus, the inventors have sought for a method for increasing the heating quantity only for the region on which an image is printed instead of increasing the heating quantity for the entire recording medium 17.

The inventors have focused on the fact that infrared rays have better transmission than other types of light, and attempted to print a mirror image of the black toner K image 58 as a solid black image on the rear face of the black toner K image 58.

Figure 6A:
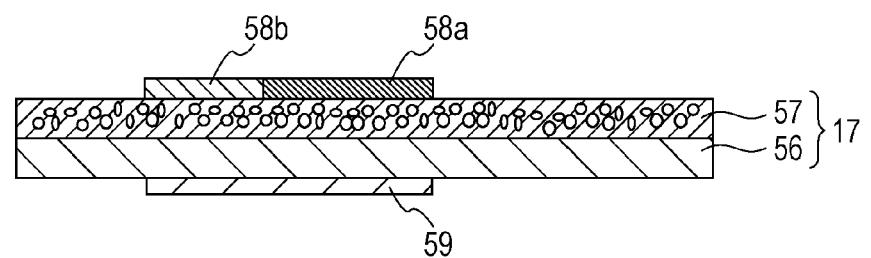
FIGS. 6A and 6B are third diagrams illustrating the basic concept of forming a three-dimensional plane with a black density of an image printed in black toner on the recording medium and an amount of expansion formed by the thermal expansion processing unit in the three-dimensional printer according to the first embodiment.
Figure 6B:
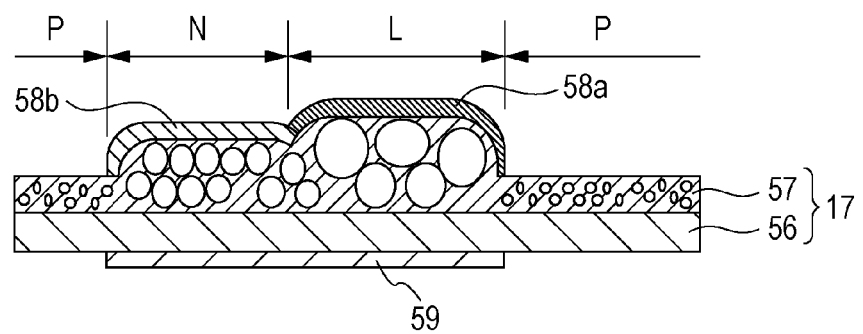

FIG. 6A is a cross-sectional view illustrating a form in which a solid black mirror image 59 of the black toner K image 58 is printed on the rear face of the recording medium 17, that is, the surface of the base material 56, and FIG. 6B is a view illustrating a state of raised portions as a result of expansion of the foamable resin layer 57 when the recording medium 17 is heated from the front face or the rear face.

A stiff sheet material having a relatively large heat capacity and not being deformable is used for the base material 56. Since the base material 56 is stiff and not deformable, the base material 56 has an effect of suppressing expansion toward the base material 56 when the foamable resin layer 57 expands.

Thus, even when either of the front and the rear of the recording medium 17 on which the solid black mirror image 59 of the black toner K black image 58 (58a, 58b) is printed is heated, part of the resin layer corresponding to the solid black mirror image 59 of the recording medium 17 receives the quantity of heat absorbed by the solid black mirror image 59, foams evenly and expands uniformly.

Regions N and L of the resin layer illustrated in FIG. 6B corresponding to a black toner K black image 58*a* with a low density and a black toner K black image 58*b* with a high density, respectively, receive the quantities of heat absorbed in proportion to the densities of the black toner K black images 58*a* and 58*b*, and foam and expand in proportion to the densities of the black toner K black images 58*a* and 58*b*.

Note that FIG. 6B shows the raised amounts combining the amount of even and uniform expansion for the solid black mirror image 59 and the amounts of expansion in proportion to the densities of the black toner K black images 58*a* and 58*b*. In this manner, since the recording medium 17 can receive transmission of heat and be subjected to expansion limited to the image forming regions from both faces as a result of heating, a desired raised amount can be obtained with a small amount of heating energy.

Specifically, for a recording medium 17 having a normal heat capacity, a black toner K black image 58 is formed only on the front face thereof, and the recording medium 17 is then heated and expanded. For a recording medium 17 having a larger heat capacity than a normal heat capacity, a black toner K black image 58 is formed on the front face and a solid black mirror image 59 is formed on the rear face, and the recording medium 17 is then heated and expanded. In both cases, desired raised amounts can be obtained.

Although an example in which the black toner K black images 58*a* and 58*b* different in the density (gradation) are formed as the black toner K black image 58 is illustrated in FIGS. 6A and 6B, a clear difference between a case in which the solid black mirror image 59 is present on the rear face and a case in which no solid black mirror image 59 is present can be seen through examination simply using a black toner K black image 58 of a single scale (such as solid black).

Figure 7:
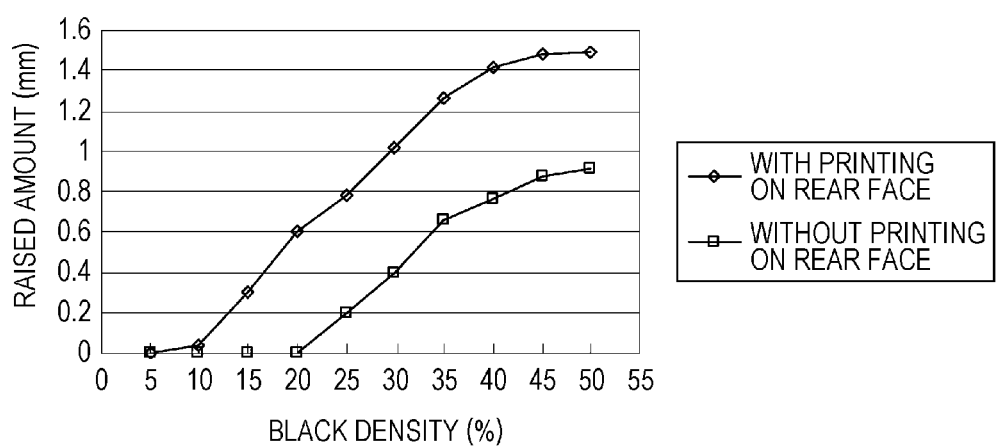
FIG. 7 is a fourth diagram illustrating the basic concept of forming a three-dimensional plane with a black density of an image printed in black toner on the recording medium and an amount of expansion formed by the thermal expansion processing unit in the three-dimensional printer according to the first embodiment.

FIG. 7 is a characteristic chart illustrating the relation between the black density and the raised amount in a case where the solid black mirror image 59 is present on the rear face and in a case where no solid black mirror image 59 is present on the rear face of a recording medium 17 with a relatively large heat capacity. FIG. 7 shows the black density (%) on the horizontal axis and the raised amount (mm) on the vertical axis.

A curve of plots represented by diamonds in FIG. 7 shows the relationship characteristics between the black density and the raised amount in the case where the solid black mirror image 59 is present on the rear face, and a curve of plots represented by squares shows the relationship characteristics between the black density and the raised amount in the case where no solid black mirror image 59 is present on the rear face.

In the characteristic chart of FIG. 7, when the black density is 50%, for example, the raised amount in the case where the solid black mirror image is not printed on the rear face is 0.9 mm while the raised amount in the case where the solid black mirror image is printed on the rear face is 1.5 mm. Thus, the raised amount with the printing on the rear face is larger by more than 60% than that without the printing on the rear face. This shows that printing of the solid black mirror image 59 on the rear face makes the heating effect greater for the recording medium 17 having a relatively large heat capacity.

FIG. 8 is a flowchart illustrating processing operation for forming a desired raised amount in the image printed on the recording medium 17 regardless of the magnitude of the heat capacity of the recording medium 17 by the CPU 45 of the controller according to the present embodiment.

FIGS. 9A to 9D, 10A and 10B are diagrams for clearly explaining processing operation in steps S3 and S5 of the flowchart.

First, in FIG. 8, the CPU 45 measures the basis weight of the sheet (base material 56) that is the recording medium 17 by the heat capacity measuring unit 48 (step S1). In this process, since the thickness of the foamable resin layer 57 before foaming is known, the measurement of the basis weight can by replaced by measurement of the thickness of the recording medium 17, for example. The thickness of the recording medium 17 may be measured when the recording medium 17 is nipped by the pair of standby rollers 16, between the heating roller 22 and the pressing roller 23 in the fixing part 21, or by the pair of discharge rollers 24 along the path between the pair of standby rollers 16 and the pair of discharge rollers 24, can be measured by using a sensor for thickness measurement that is not illustrated, or in like manner. Alternatively, the thickness may be measured, entered and stored by the user in advance, and the heat capacity measuring unit 48 may use the entry.

Subsequently, the CPU 45 stores the measured basis weight data in a predetermined area of the EEPROM 52 (step S2), and subsequently prints an image to be printed on the front face of the sheet (step S3). In this process, an image illustrated in FIG. 9A, for example, is printed.

Figure 9A:
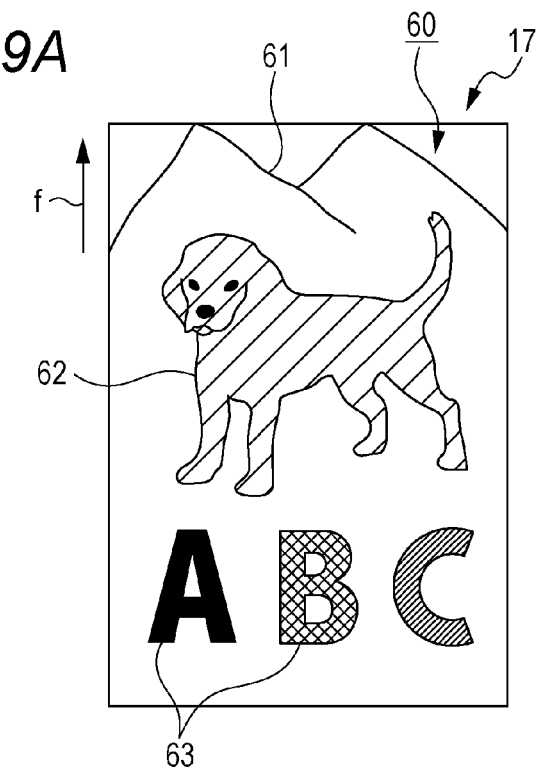
FIGS. 9A, 9B, 9C, and 9D are first diagrams for clearly explaining the processing operation illustrated by the flowchart of FIG. 8.

The image 60 illustrated in FIG. 9A includes a contour 61 of a background mountain, a standing image 62 of a dog under the mountain contour 61, and characters ABC 63 in three different scales under the feet of the dog. The image 60 is printed as the black toner K image 58 on the front face of the sheet conveyed in the direction of an arrow f.

Subsequently, in FIG. 8, the CPU 45 reads out the basis weight data stored in the predetermined area of the EEPROM 52, and determines whether or not the read out basis weight data is equal to or larger than 157 $m^2$ (step S4).

If the basis weight data is smaller than 157 $m^2$ (No as a result of determination in step S4), the base material 56 of the recording medium 17 is determined to be a sheet having a normal heat capacity, and a sheet heating process is immediately performed (step S6).

In this process, at the secondary transfer part where the driven roller 8 and the secondary transfer roller 15 are opposed to each other as illustrated in FIG. 1, the image 60 illustrated in FIG. 9A is printed on the surface of the foamable resin layer 57, and the recording medium 17 on which the image 60 is fixed at the fixing part 21 is heated while being conveyed at the thermal expansion processing unit 3.

Note that since the processes of color printing and sheet discharge by the inkjet printer unit 4 that follow are described with reference to FIGS. 1 and 2 above, the description is not repeated here.

If the basis weight data is equal to or larger than 157 $m^2$ in the determination in step S4 (Yes as a result of the determination in step S4), the CPU 45 prints a minor image of the image 60 turned by 180° in black solid on the rear face of the recording medium 17 conveyed to the secondary transfer part via the double-side printing conveyance unit 5 (step S5).

Figure 9B:
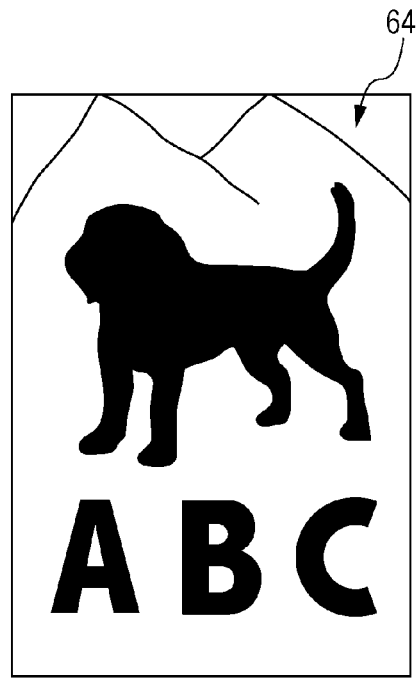
Figure 9C:
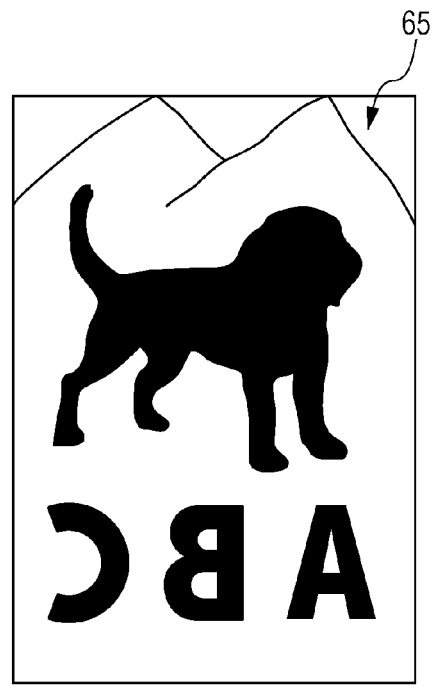

In this process, first, as illustrated in FIG. 9B, a black solid image (binary image) 64 of the image 60 is formed in the frame memory 55. The CPU 45 further reverses the binary image 64 to form a reversed, mirror image 65 thereof as illustrated in FIG. 9C. The CPU 45 further forms a turned mirror image 66 by turning the reversed, mirror image 65 by 180°.

The reason for which this complicated image processing is performed will be explained. With the recording medium 17 having the basis weight data representing a relatively large heat capacity of 157 m², a solid black minor image 59 of the image 60 illustrated in FIG. 9A needs to be printed on the rear face of the image 60 (black toner K image 58) to obtain a desired raised amount for the image 60 (see FIGS. 6A and 6B).

Since printing is also performed on the rear face, that is, for double-side printing, the recording medium 17 onto which the image 60 illustrated in FIG. 9A is fixed is turned upside down and further reversed front-to-back through the double-side printing conveyance unit 5 and conveyed to the secondary transfer part from the back end of the image 60.

Figure 10A:
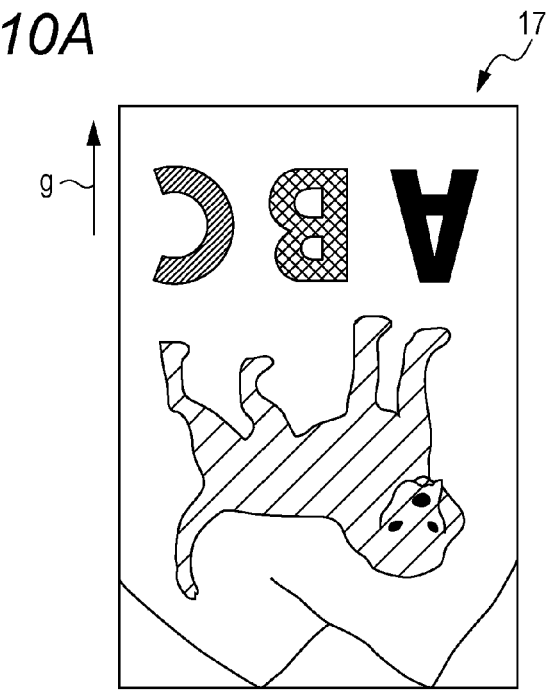
FIGS. 10A and 10B are second diagrams for clearly explaining the processing operation illustrated by the flowchart of FIG. 8.

In this process, when the recording medium 17 is viewed from the secondary transfer roller 15, the image 60 is reversed upside down and left-to-right and faces the secondary transfer roller 15 while the recording medium 17 is conveyed as illustrated in FIG. 10A. The outline of the image 60 reversed upside down and left-to-right illustrated in FIG. 10A as viewed in a perspective manner form the transfer belt 6 and the driving roller 7 is as illustrated in FIG. 10B.

Figure 9D:
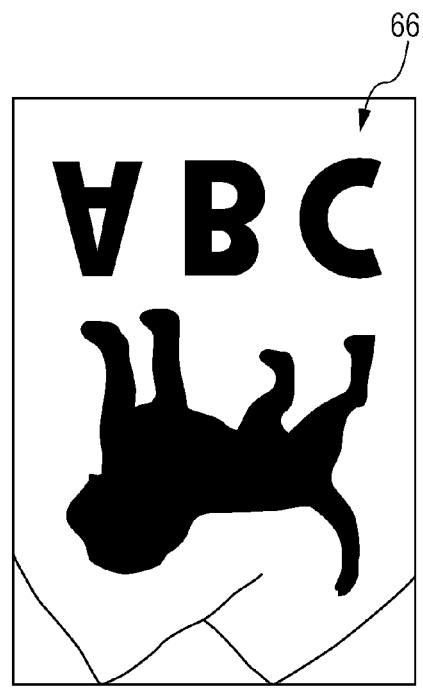
Figure 10B:
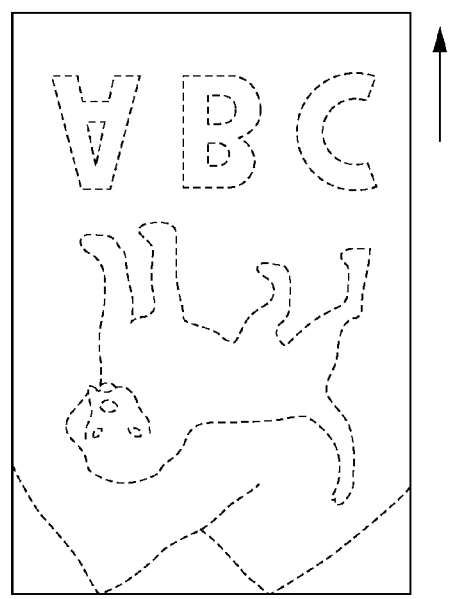

The outline illustrated in FIG. 10B is the same as the outline of the turned mirror image 66 illustrated in FIG. 9D. In step S5, the CPU 45 prints the turned mirror image 66 onto the rear face of the recording medium 17 conveyed to the secondary transfer part. As a result, the black solid image that is a reversed, mirror image of the image 60 is printed on the rear face of the recording medium 17 (see FIG. 6A).

Subsequently, the CPU 45 performs the process in step S6 described above. As a result, a raised amount equal to that for a recording medium 17 having a normal heat capacity can also be obtained for a recording medium 17 having a large heat capacity without increasing the heating quantity.

Although certain embodiments of the present invention have been described, the present invention is within a scope of the invention defined in the claims and the equivalents. For example, although the heat ray emitting unit 29 is arranged below the medium conveyance path 27 in the thermal expansion processing unit 3 in the embodiment described above, a heat ray emitting unit may be additionally arranged at an upper position depending on the heat capacity of the thermally expandable sheet.

In addition, various further modifications can be made without departing from the scope of the present invention.

What is claimed is:

1. A three-dimensional printer comprising:
a first printed image forming unit configured to form a first printed image on one face of a thermally expandable sheet in which a thermally expandable layer is formed;
a second printed image forming unit configured to form a second printed image on the other face of the thermally expandable sheet, the second printed image having a certain density, and the certain density increasing in accordance with an increase of a thermal capacity of the thermally expandable sheet; and
a heat applying and expanding unit configured to apply thermal energy to the thermally expandable sheet to expand the thermally expandable layer;
wherein the second printed image forming unit forms the second printed image so as to have the certain density at both a third part and a fourth part of the second printed image, the third part of the second printed image corresponding to a first part of the first printed image, the first part of the first printed image having a first density, the fourth part of the second printed image corresponding to a second part of the first printed image, and the second part of the first printed image having a second density lower than the first density.

2. The three-dimensional printer according to claim 1, wherein the second printed image forming unit forms the second printed image with a material having photothermal conversion characteristics such that the second printed image is formed on a region corresponding to a region on which the first printed image is formed.

3. The three-dimensional printer according to claim 2, wherein the thermally expandable sheet is formed with raised and recessed shapes corresponding to the first printed image on a surface on a side of the one face by the thermal energy generated and applied by the material having photothermal conversion characteristics.

4. The three-dimensional printer according to claim 3, wherein the thermal energy is energy generated by the material having photothermal conversion characteristics as a result of radiation of light at infrared wavelengths.

5. The three-dimensional printer according to claim 4, wherein the light is emitted onto the other face of the thermally expandable sheet, and is further emitted onto the one face when the thermal capacity of the thermally expandable sheet is large.

6. A three-dimensional image formed by:
forming a first printed image on one face of a thermally expandable sheet in which a thermally expandable layer is formed;
forming a second printed image on the other face of the thermally expandable sheet, the second printed image having a certain density, and the certain density increasing in accordance with an increase of a heat capacity of the thermally expandable sheet; and
applying thermal energy to the thermally expandable sheet to expand the thermally expandable layer;
wherein the forming the second printed image comprises forming the second printed image so as to have the certain density at both a third part and a fourth part of the second printed image, the third part of the second printed image corresponding to a first part of the first printed image, the first part of the first printed image having a first density, the fourth part of the second printed image corresponding to a second part of the first printed image, and the second part of the first printed image having a second density lower than the first density.

7. A three-dimensional image forming method, the method comprising:
forming a first printed image on one face of a thermally expandable sheet in which a thermally expandable layer is formed;
forming a second printed image on the other face of the thermally expandable sheet, the second printed image having a certain density, and the certain density increasing in accordance with an increase of a thermal capacity of the thermally expandable sheet is; and
applying thermal energy to the thermally expandable sheet to expand the thermally expandable layer;
wherein the forming the second printed image comprises forming the second printed image so as to have the certain density at both a third part and a fourth part of the second printed image, the third part of the second printed image corresponding to a first part of the first printed image, the first part of the first printed image having a first density, the fourth part of the second printed image corresponding to a second part of the first printed image, and the second part of the first printed image having a second density lower than the first density.

8. The three-dimensional printer according to claim 1, further comprising:
a heat capacity measuring unit configured to measure one of a basis weight of the thermally expandable sheet and a thickness of the thermally expandable sheet;
wherein, when the basis weight measured by the heat capacity measuring unit is smaller than a predetermined value, the heat applying and expanding unit applies thermal energy to the thermally expandable sheet to expand the thermally expandable layer without forming the second printed image on the other face of the thermally expandable sheet by the second printed image forming unit.

9. The three-dimensional printer according to claim 1, further comprising:
a heat capacity measuring unit configured to measure one of a basis weight of the thermally expandable sheet and a thickness of the thermally expandable sheet;
wherein, when the basis weight measured by the heat capacity measuring unit is equal to or larger than a predetermined value, the heat applying and expanding unit applies thermal energy to the thermally expandable sheet to expand the thermally expandable layer after forming the second printed image on the other face of the thermally expandable sheet by the second printed image forming unit.

10. The three-dimensional printer according to claim 1, wherein the second image is a solid black image.

* * * * *

UNITED STATES PATENT AND TRADEMARK OFFICE
CERTIFICATE OF CORRECTION

Page 1 of 1

PATENT NO. : 9,162,486 B2
APPLICATION NO. : 14/467271
DATED : October 20, 2015
INVENTOR(S) : Motoyanagi It is certified that error appears in the above-identified patent and that said Letters Patent is hereby corrected as shown below:

On the Title page, item (57), line 12, change "minor" to --mirror--.

In the claims

Column 12, claim 7, line 10, change "sheet is;" to --sheet;--.

Signed and Sealed this
Seventh Day of June, 2016

Michelle K. Lee
*Director of the United States Patent and Trademark Office*